United States Patent [19]
Saloom

[11] Patent Number: 5,387,381
[45] Date of Patent: Feb. 7, 1995

[54] METHOD FOR EXTRUDING PLASTIC WITH ACCENT COLOR PATTERN

[75] Inventor: Thomas J. Saloom, Plainsboro, N.J.

[73] Assignee: Alcan Aluminum Corporation, Cleveland, Ohio

[21] Appl. No.: 696,338

[22] Filed: May 1, 1991

Related U.S. Application Data

[63] Continuation of Ser. No. 447,264, Dec. 7, 1989, abandoned.

[51] Int. Cl.$^6$ .............................................. B29C 47/06
[52] U.S. Cl. ................................... 264/75; 264/171; 264/210.1; 264/245; 425/132; 425/133.5
[58] Field of Search .................. 264/73, 74, 75, 171, 264/173, 245, 210.1; 425/131.1, 133.5, 132

[56] References Cited

U.S. PATENT DOCUMENTS

| | | | |
|---|---|---|---|
| 3,488,246 | 1/1970 | Duggins | 264/75 |
| 3,769,380 | 10/1973 | Wiley | 264/75 |
| 3,871,629 | 3/1975 | Hishida | 366/76 |
| 3,906,065 | 9/1975 | Schneider et al. | 264/75 |
| 4,048,101 | 9/1977 | Nakamachi | 264/75 |
| 4,128,689 | 12/1978 | Heaps et al. | 264/75 |
| 4,302,410 | 11/1981 | Beech | 264/45.9 |
| 4,505,869 | 3/1985 | Nishibori | 264/115 |
| 4,528,155 | 7/1985 | Elder | 264/174 |
| 4,649,008 | 3/1987 | Johnstone | 264/177.1 |
| 5,053,176 | 10/1991 | Cameron et al. | 264/75 |

FOREIGN PATENT DOCUMENTS

| | | | |
|---|---|---|---|
| 557582 | 5/1958 | Canada | 264/75 |
| 53-90372 | 8/1978 | Japan | 264/75 |
| 55-8336 | 3/1980 | Japan | 264/75 |
| 55-139243 | 10/1980 | Japan | 264/75 |
| 336264 | 10/1930 | United Kingdom | 264/75 |
| 740994 | 11/1955 | United Kingdom | 264/75 |

*Primary Examiner*—Mathieu D. Vargot
*Attorney, Agent, or Firm*—Calfee Halter & Griswold

[57] ABSTRACT

A new and useful process for producing a plastic article (e.g., vinyl siding) with an accent color pattern incorporated therein, and a specially formed accent color pellet which is useful in such a process. The process contemplates extruding a plastic product from a base compound formed of powder sized particles and specially formed accent color pellets. The accent color pellets are alloyed masses of resins and pigment which are larger than the powder particles of the base compound, and have a higher deflection temperature than the base compound. The alloyed pellets are designed with controlled heat deflection characteristics. During the extrusion process, the accent color pellets begin to soften and disperse later than the base compound, and cause restricted dispersion of the accent color into the base compound, thereby producing accent color streaks in the resulting extrudate. The process is particularly suited for producing a simulated woodgrain or streaking effect in plastic. (e.g., vinyl) siding.

18 Claims, 1 Drawing Sheet

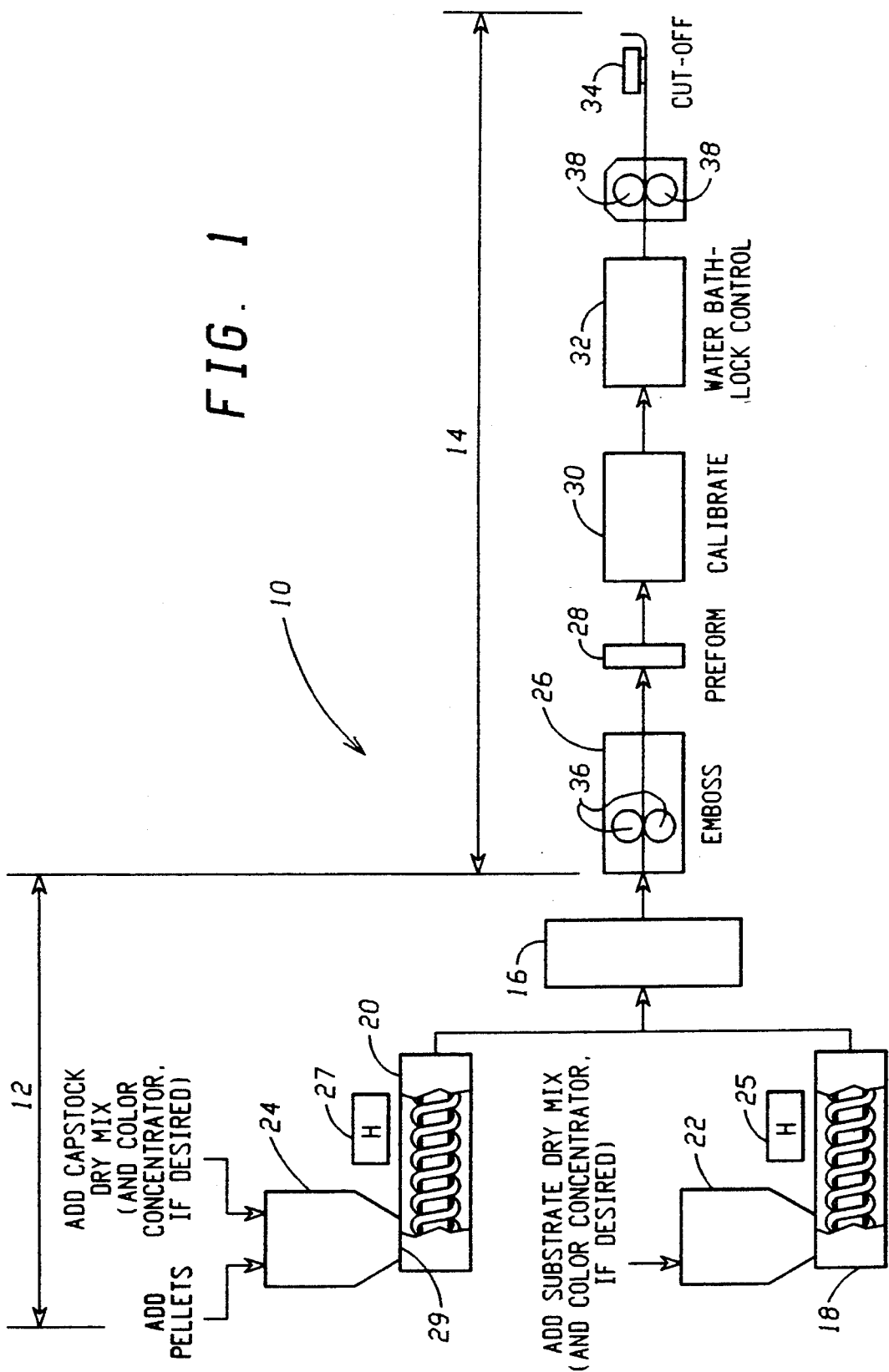

METHOD FOR EXTRUDING PLASTIC WITH ACCENT COLOR PATTERN

This is a continuation of copending application(s) Ser. No. 07/447,264 filed on Dec. 7, 1989, now abandoned.

TECHNICAL FIELD

The present invention relates to a method of manufacturing a plastic article with an accent color pattern incorporated therein, and to a special product which can be used to produce the accent color pattern in the plastic article. The present invention relates particularly to a method of extruding a plastic article, such as vinyl siding, with a simulated woodgrain or multicolored appearance, and to a specially formed accent color pellet which is used in extruding such a plastic article.

BACKGROUND OF THE INVENTION

Plastic articles, such as vinyl siding with simulated woodgrain or multicolored appearance, and methods of forming such plastic articles are known. One known process for forming vinyl siding with a simulated woodgrain appearance is shown in U.S. Pat. No. 4,048,101. The patent states that the process produces a synthetic plastic wood product with a multi-color effect.

SUMMARY OF THE PRESENT INVENTION

The present invention provides a new and useful process for producing a plastic article (e.g., vinyl siding) with an accent color pattern incorporated therein, and to a specially formed accent color pellet which is useful in such a process.

The process of the present invention contemplates extruding a plastic product from a base compound formed of powder sized particles and specially formed accent color pellets. The base compound, known in the art as "capstock", is a powdered blend of a polyvinylchloride material, titanium dioxide (TiO$_2$), minor amounts of acrylic impact modifier, stabilizer, wax and minute amounts of pigment, and possibly conventional color concentrate. The accent color pellets are larger than the powder particles of the base compound, and have a higher deflection temperature than the base compound. During the extrusion process, the accent color pellets begin to soften and disperse later than the base compound, and cause restricted dispersion of the accent color into the base compound, thereby producing accent color streaks in the resulting extrudate. The process is particularly suited for producing a simulated woodgrain or streaking effect in plastic (e.g., vinyl) siding.

The special accent color pellets are alloyed ("fused") pellets comprising principally resin and pigment. The resin is either a single material or a combination of resin materials, which produces a pellet with a deflection temperature substantially higher than the deflection temperature of the base compound. Specifically, the pellets are designed such that the deflection temperature of the pellets is 30–60% higher than the deflection temperature of the base compound. Further, the alloyed pellets are designed with controlled heat deflection characteristics. Additionally, the pellets have a much lower surface area per unit weight than the base compound. When introduced with the base compound into an extruder, the pellets soften and disperse later than the base compound, and allow only restricted dispersion of the accent color into the extrudate, thereby producing the desired accent color pattern in the extrudate. In essence, the accent color patterns produced by the pellets in the extrudate are "randomly predictable" (i.e., the temperature at which the pigment will soften and disperse, and the extent to which the accent color pigment disperses in the extrudate are generally "predictable", but the specific nature and locations of the accent color patterns produced in the extrudate will be somewhat "random", due to such factors as the rate and manner of mixing of base compound with the pellets in the extruder, the specific temperature profile of the extruder, etc.).

After the accent color pellets are formed, they are introduced into the extruder along with the base compound. The accent color pellets are preferably added to the throat of the extruder, in an amount equal to 3–10% by weight of material added to the extruder. The pellets can be continuously introduced into the extruder, or they can be introduced into the extruder in an intermittent, pulsed fashion. The accent color pellets soften and disperse later than the base compound, and disperse the accent color into the extrudate in a restricted fashion, to provide a woodgrain or streaking effect in the extrudate.

Applicant has found that with vinyl siding produced by the process the invention, the accent color patterns or streaks formed in the extrudate appear to wear better than the base compound in the extrudate. Thus, the accent color patterns or streaks become more pronounced with time. This feature hides the effect of weathering of the siding, and also hides surface defects produced in the siding during manufacture.

Further aspects of the present invention will become apparent from the following detailed description and the accompanying drawing.

BRIEF DESCRIPTION OF THE DRAWING

FIG. 1 is a schematic illustration of a system for extruding vinyl siding according to the principles of the present invention.

DETAILED DESCRIPTION OF THE PREFERRED EMBODIMENT

FIG. 1 illustrates a system 10 for producing a plastic (i.e., vinyl) siding panel. The system 10 includes an extrusion section 12 in which vinyl material is extruded into a flat vinyl web, and a post-forming section 14 in which the extruded vinyl web, while in a hot, semi-viscous state, is formed into a siding profile.

The extrusion section 12 includes an extrusion die 16, a pair of screw extruders 18, 20 for feeding material, under predetermined heat and pressure conditions, into the extrusion die 16, and a pair of feed chambers 22, 24 each designed to mix and feed material into a respective one of the screw extruders 18, 20. In the manufacture of vinyl siding, it is known to extrude two layers of vinyl through the extrusion die 16 to form an extrudate comprising two layers of vinyl bonded together. One layer of the vinyl, is known as the substrate. The substrate, which is hidden from view when the siding is applied to a building, can be formed of a conventional, relatively unexpensive, but sturdy vinyl (e.g., a polyvinylchloride material known as rigid PVC). The other layer, commonly referred to in the art as "capstock", forms part of the exposed, outer component of the vinyl product. The capstock may have the same or a different composition than the substrate, and also includes the special accent color producing material, as discussed further hereinafter.

The substrate is mixed in the feed chamber 22 (along with a conventional color concentrator, if desired), and then introduced into extruder 18. In the extruder 18, the substrate is heated by heating element(s) 25 to soften (i.e., melt) the substrate into a viscous state before the substrate is introduced into the extrusion die 16. The special accent color producing pellets are mixed with the capstock in feed chamber 24 and are introduced with the capstock into the throat 29 of the extruder 20. A conventional color concentrator can also be added to the capstock in feed chamber 24, if desired, and introduced with the capstock and the pellets into the extruder 20. In the extruder 20, the capstock is heated, by heating elements 27, to soften the capstock into a viscous state before the capstock is introduced into the extrusion die 16. Moreover, in the extruder, the pellets due to their controlled heat deflection characteristics, soften and disperse into the capstock in a restricted fashion to introduce accent color streaks or patterns into the viscous capstock. The substrate and the capstock are introduced together into the extrusion die 16. In the extrusion die 16, the viscous substrate and the viscous capstock (including the accent color streaks produced by the pellets) are extruded together into a web of vinyl.

In the post-forming section 14, the extruded web of vinyl, while in a hot semi-viscous state, is formed into a siding configuration. The post-forming section 14 includes an embosser 26, a preform die 28, a calibrator 30, a water bath 32 and a cutoff mechanism 34.

The embosser 26 is located immediately downstream of the extrusion die 16. The embosser 26 is designed to emboss the surface configuration or ornamentation onto the capstock side of the web of vinyl. Further, the rolls 36 of the embosser 26 apply tension to the web of vinyl to neck the web of vinyl down to a particular dimension.

The pre-form die 28 is located immediately downstream of the embosser 26. In the pre-form die 28, the web of vinyl, while still in a hot, semi-viscous state is pre-formed into a rough version of its final siding profile.

After leaving the pre-form die 28, the web of vinyl material, while still in a hot semi-viscous state, is directed through the calibrator 30. In the calibrator 30, the rough version of the siding profile is formed into its final shape. Vacuum drawing means are provided in the calibrator 30, to draw the vinyl siding material against the walls of the calibrator and into its final siding shape.

After leaving the calibrator 30, the vinyl siding material is drawn through the water bath 32. In the water bath 32, final lock, or dimensional control of the siding profile, is effected. The water bath is preferably maintained at a temperature of about 90°–100° F. and helps set up the siding in its predetermined, final profile. A pair of rubber rolls 38 draw the siding through the foregoing stages.

Finally, downstream of the rubber rolls 38, there is the cutoff mechanism 34. At the cutoff mechanism 34, the siding is cut to the appropriate lengths to form siding panels.

The foregoing post-forming features of a vinyl siding extrusion system are known to those in the art, and should require no further discussion. Further information about post-forming techniques can be obtained from U.S. Pat. No. 4,649,008.

As discussed above, the present invention relates to the manner in which accent color patterns or streaks are formed in the vinyl siding. In the preferred system disclosed above, the accent color patterns are introduced into the capstock, since the capstock forms the externally exposed portion of the siding.

In the system of FIG. 1, the capstock is formed by a dry mix of powder sized particles including resin (e.g., polyvinylchloride), base color pigment material, and conventional additives (e.g., stabilizers). The capstock is mixed in the chamber 24 and is fed into the throat 29 of the extruder 20. The specially formed pellets, for introducing accent color into the capstock, are incorporated with the capstock in the chamber 24 and introduced with the capstock into the throat 29 of the extruder 20.

The pellets are preferably formed by alloying ("fusing") resin, such as a acrylics, polycarbonates, etc. to produce an alloy with a relatively high deflection temperature (e.g., at least about 210° F.), and incorporating into the alloy color producing materials such as titanium dioxide ($TiO_2$), pigment and additives such as stabilizer material. The resulting alloy is then chopped into pellets, preferably about 1/32" to ⅛" in size. The pellets are then added into the chamber 24 at the rate of about 3–10% by weight of the capstock/pellet mixture. The pellets can be added to the chamber 24 in a continuous fashion, or in an intermittent, pulsed fashion.

The materials forming the pellets are designed such that the pellets will be larger than the powder sized particles of the capstock (i.e., the pellets will have a lower surface area per unit weight than the powder sized particles of the capstock). Further, the pellets are designed to have a heat deflection temperature at least 30–60% higher than the heat deflection temperature of the capstock. Moreover, the pellets are designed to have controlled heat deflection characteristics and to produce a restricted, randomly predictable dispersion of the accent color pigment into the capstock, under the extrusion parameters for the capstock. Thus, for capstock with a heat deflection temperature of about 160° F., and designed to be heated to at least 300° F. in the extruder 20, the pellets are designed with a heat deflection temperature of at least about 210° F. but not above 260° F.

As the capstock material and the pellets are being heated, in the extruder 20, the pellets tend to encapsulate the pigment material so that it does not disperse well into the main pigment color of the capstock. When extruded through the extrusion die 16, the accent color streaks tend to stretch, and do not disperse to any significant degree further into the extrudate.

EXAMPLE

A coextruded residential vinyl siding was prepared using conventional powdered polyvinylchloride (PVC) as substrate and a conventional powdered polyvinylchloride as capstock. The capstock formulation employed is a typical formulation used for exterior applications containing 10% $TiO_2$ and minor amounts of acrylic impact modifier, stabilizer, wax and process aid along with minute amounts of pigment that was dry-blended into the compound in a high intensity mixer. The capstock (and substrate) have a typical PVC heat deflection (i.e., softening) temperature of about 160° F.

A black color pellet was prepared in a banbury mixer from the following materials:

33% acrylic resin (known as KMAX T-260) having a heat deflection temperature of about 270° F. by Rohm & Haas;

27% plexiglass DR-100 having a heat deflection temperature of about 190° F. manufactured by Rohm & Haas;

10% R-960 TiO$_2$ that had been surface treated to reduce chalking, manufactured by DuPont.

30% #7895 black pigment manufactured by Harshaw.

The above mixture was then chopped to the desired size in a dicer then classified using appropriate screens to obtain pellets of ⅛" to 1/32".

The coextrusion was performed on a setup employing a DSK-62 twin screw extruder for capstock and a TS-100 twin screw for substrate. The black color pellets were introduced at the throat of the DSK-62 twin screw (capstock extruder) in the ratio of 1 part black pellets to 100 parts of capstock powder. The capstock extruder was set at 2350 rpm (motor) and feed at 1050 rpm (motor). The barrel of the capstock extruder was set to a nominal temperature ranging from 340° to 315° F. The extrusion produced a flat sheet having a capstock with accent color streaks formed by deflection of the black color pellets. The flat sheet was then post-formed and cooled by conventional methods to produce profile of exterior siding.

The resultant siding had a surface with a varigated color that approximated the appearance of a natural woodgrain.

In the foregoing example, the resin material used as capstock and the resin materials used to form the pellets have the following heat deflection characteristics under load (using ASTM Test Method D-648).

| Heat Deflection Temperatures Under Load | | |
|---|---|---|
| | 66 psi | 264 psi |
| Rigid PVC | 135°–185° F. (160° F.) | 140°–170° F. (155° F.) |
| DR-100 | 180°–205° F. (192.5° F.) | 165°–209° F. (187° F.) |
| KMAX T-260 | 271° F. | 279° F. |

Thus, for capstock with a deflection temperature of about 160° F. which is extruded at temperatures slightly above 300° F., it is preferable to form the pellets whose heat deflection characteristics are such that the pellets will deflect at temperatures between about 210° F. and about 260° F. With alloyed pellets having the heat deflection characteristics described above, the accent color will be dispersed into a capstock extrudate in a restricted, randomly predictable manner, to produce accent color streaks into the capstock, thereby to create a simulated woodgrain effect in a vinyl siding product.

Thus, according to the foregoing disclosure, applicant has provided a unique process, incorporating a specially formed pellets to produce accent color patterns into extruded plastic articles. With the foregoing disclosure in mind, it is believed that various types of pellet constructions, for producing various types of simulated or streaked colored patterns in extruded products will become apparent to those of ordinary skill in the art.

I claim:

1. A method of producing a plastic extrudate with a base color and at least one accent color, comprising the steps of:

a) introducing into an extruder a base color producing material and an accent color producing material, said base color producing material comprising powder sized material, said accent color producing material comprising pellets which (i) are larger than the powder sized material of said base color material, (ii) have a higher deflection temperature than said base color material; and (iii) wherein said base color producing material comprises polyvinylchloride and wherein said accent color producing material comprises a material selected from the group consisting of acrylics, polycarbonates and mixtures thereof;

b) extruding said base color producing material and said accent color producing material through an extrusion die to form the plastic extrudate under processing temperatures whereby the accent color carrying pellets cause delayed introduction and restricted dispersion of the accent color into the plastic extrudate;

c) introducing into said extrusion die a substrate producing material, and co-extruding said substrate producing material with said base color producing material and said accent color producing material.

2. A method as set forth in claim 1, wherein each of said pellets comprises an alloyed mass of resins and accent color pigment, said pellets and said base color material being introduced at the same location into the extruder.

3. A method as set forth in claim 2, wherein said accent color material is introduced into said extruder in an amount of about 3–10% by weight of material introduced into said extruder.

4. A method as set forth in claim 3, wherein said base color material is continuously introduced into said extruder and said accent color producing material is intermittently introduced into said extruder.

5. A method as set forth in claim 3 wherein said base color material and said accent color producing material are continuously introduced into said extruder.

6. A method as set forth in any of claims 1–5 wherein the step of introducing said accent color producing material comprises the step of introducing pellets of at least about 1/32" in size into said extruder.

7. A method as set forth in claim 6, wherein the powder sized material of said base color material comprises resin and base pigment, and each of said pellets having a deflection temperature 30–60% higher than the deflection temperature range of the resin of the base color material.

8. A method as set forth in claim 7 wherein said step of extruding said base color material and said accent color material comprises the step of heating the base color material and the accent color material to temperatures of at least 300° F. and said pellets have a deflection temperature of about 210° F. to about 260° F.

9. A method as set forth in claim 8 wherein each of said pellets has a lower surface area per unit weight than the powder sized material of said base color material.

10. A method of producing an extruded product having a base color and at least one accent color, comprising the steps of:

(a) forming a base compound comprising powder sized particles adapted to be extruded to produce an extrudate having said base color, (b) providing accent color pellets having a deflection temperature 30–60% higher than the deflection temperature of the base compound, said accent color pellets having a lower surface area per unit weight than the powder sized particles of the base compound, (c) providing a substrate-producing material, (d) introducing said substrate-producing material, said base compound, and said accent color pellets into an extrusion die, and (e) co-extruding said base compound, said accent color pellets, and said substrate-producing material into an extrudate with a desired product shape, said accent color pellets causing delayed introduction and restricted dispersion of accent color into the extrudate;

wherein said base compound comprises polyvinylchloride and wherein said accent color pellets are formed from a material selected from the group consisting of acrylics, polycarbonates and mixtures thereof.

11. A method as set forth in claim 10, wherein said step of forming the accent color pellets comprises the steps of (i) forming an alloy of resin and accent color pigment and (ii) forming the alloy into the accent color pellets.

12. A method as set forth in claim 11 wherein said step of introducing said base compound and said accent color pellets into said extruder comprises the step of introducing said base compound and said accent color pellets into the extruder at the same location.

13. A method as set forth in claim 12, wherein said step of introducing said accent color pellets into said extruder comprises the step of introducing said accent color pellets into said extruder in an amount of about 3-10% by weight of material introduced into said extruder.

14. A method as set forth in claim 13, wherein said step of introducing said base compound and said accent color pellets into said extruder comprises the step of continuously introducing said base compound into the extruder and intermittently introducing said accent color pellets into said extruder.

15. A method as set forth in claim 13 wherein said step of introducing said base compound and said accent color pellets into said extruder comprises the step of continuously introducing said base compound and said accent color pellets into said extruder.

16. A method as set forth in claim 13 wherein said step of co-extruding comprises the step of heating the powder sized base color material and pellets to temperatures exceeding 300° F. and said pellets have a deflection temperature from about 210° F. to about 260° F.

17. A method as set forth in any of claims 10-16 wherein the step of forming accent color pellets comprises the step of forming an alloy into pellets of at least about 1/32" in size.

18. The method of claim 1 further comprising post-forming said plastic extrudate into a profile adapted for use as a covering for the exterior of a building.

* * * * *